Jan. 2, 1951        H. SCHEIBLER        2,536,396
COUPLING AND TRANSMISSION MECHANISM
Filed Aug. 30, 1945        3 Sheets-Sheet 1

INVENTOR.

Jan. 2, 1951  H. SCHEIBLER  2,536,396
COUPLING AND TRANSMISSION MECHANISM
Filed Aug. 30, 1945  3 Sheets-Sheet 2
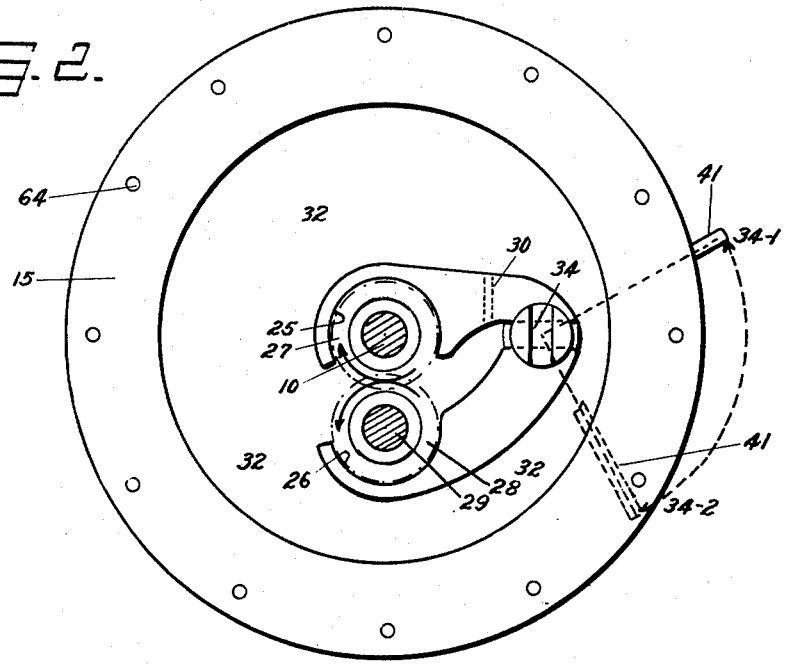
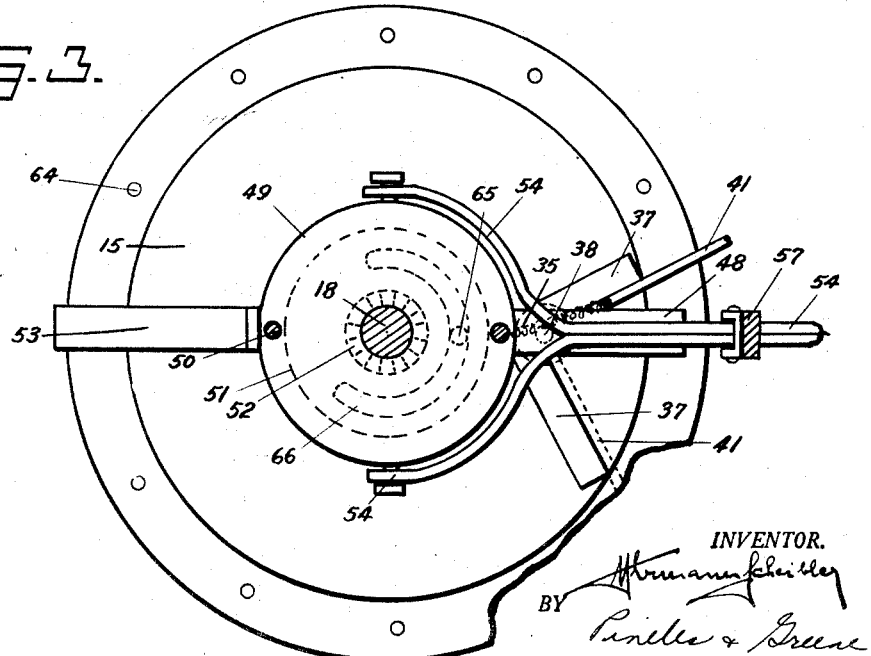
INVENTOR.
Hermann Scheibler
BY
Pinelli & Greene
Attorneys Jan. 2, 1951     H. SCHEIBLER     2,536,396
COUPLING AND TRANSMISSION MECHANISM
Filed Aug. 30, 1945     3 Sheets-Sheet 3
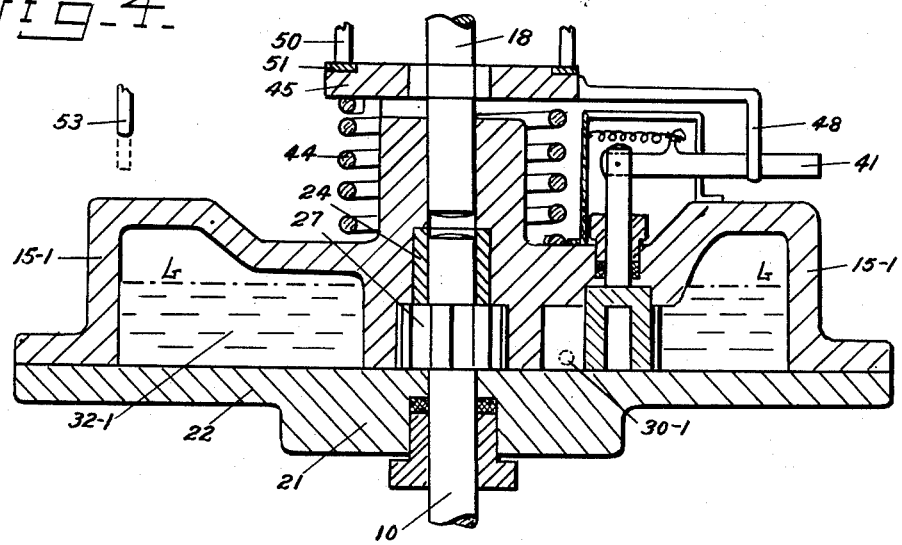
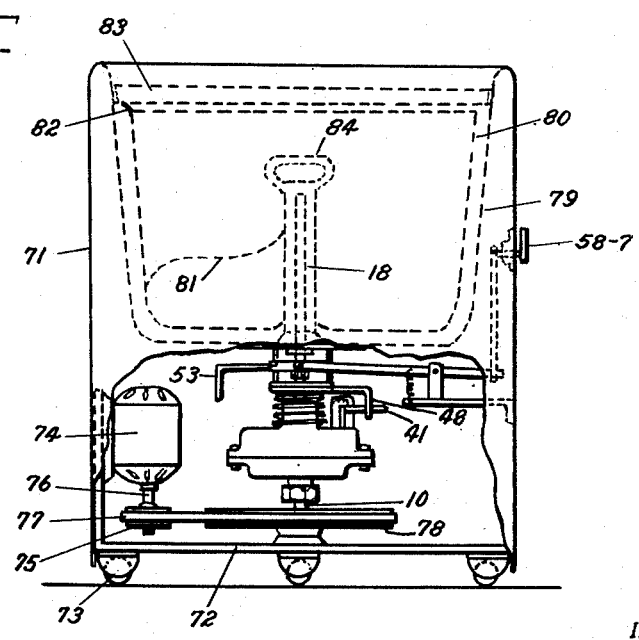

Patented Jan. 2, 1951

2,536,396

UNITED STATES PATENT OFFICE 2,536,396

COUPLING AND TRANSMISSION MECHANISM

Hermann Scheibler, Greenwich, Conn.

Application August 30, 1945, Serial No. 613,552

6 Claims. (Cl. 74—70)

The invention relates to mechanical energy transmission systems, and more particularly to a coupling and transmission mechanism which may be preset, to impart to a driven shaft, from a unidirectionally rotating drive shaft, a rotating motion or a rocking motion of variable amplitude and speed.

Such a transmission system is of particular importance in washing machines where a rocking or oscillatory motion is required for obtaining an efficient washing action and a unidirectional rotation is required for the subsequent extraction or drying phase of the washing cycle. It is understood, however, that the invention has other uses and it is not limited in any way to the use in washing machines.

Among the objects of the invention are various novel arrangements which simplify the construction and operation of such coupling and transmission mechanisms and whereby without any cumbersome and expensive gear changing apparatus, the rotating motion of a drive shaft is transmitted to a driven shaft either in form of a substantially similar rotating motion, or in form of a rocking motion, and whereby the intensity and amplitude of the rocking motion imparted to the driven shaft may be preset at will.

The foregoing and other objects of the invention will be best understood from the following description and exemplifications thereof, reference being had to the accompanying drawings wherein:

Fig. 2, is a view as seen from the bottom of Fig. 1; along line 2—2 of Fig. 1;

Fig. 3, is a view along the line 3—3 of Fig. 1.

Fig. 4, is a cross sectional view exemplifying another form of the invention;

Fig. 5, is an elevation view of a washing machine with part of the front of the housing broken away, showing one form of practical application of the invention in the driving mechanism of a washing machine.

Figure 1:
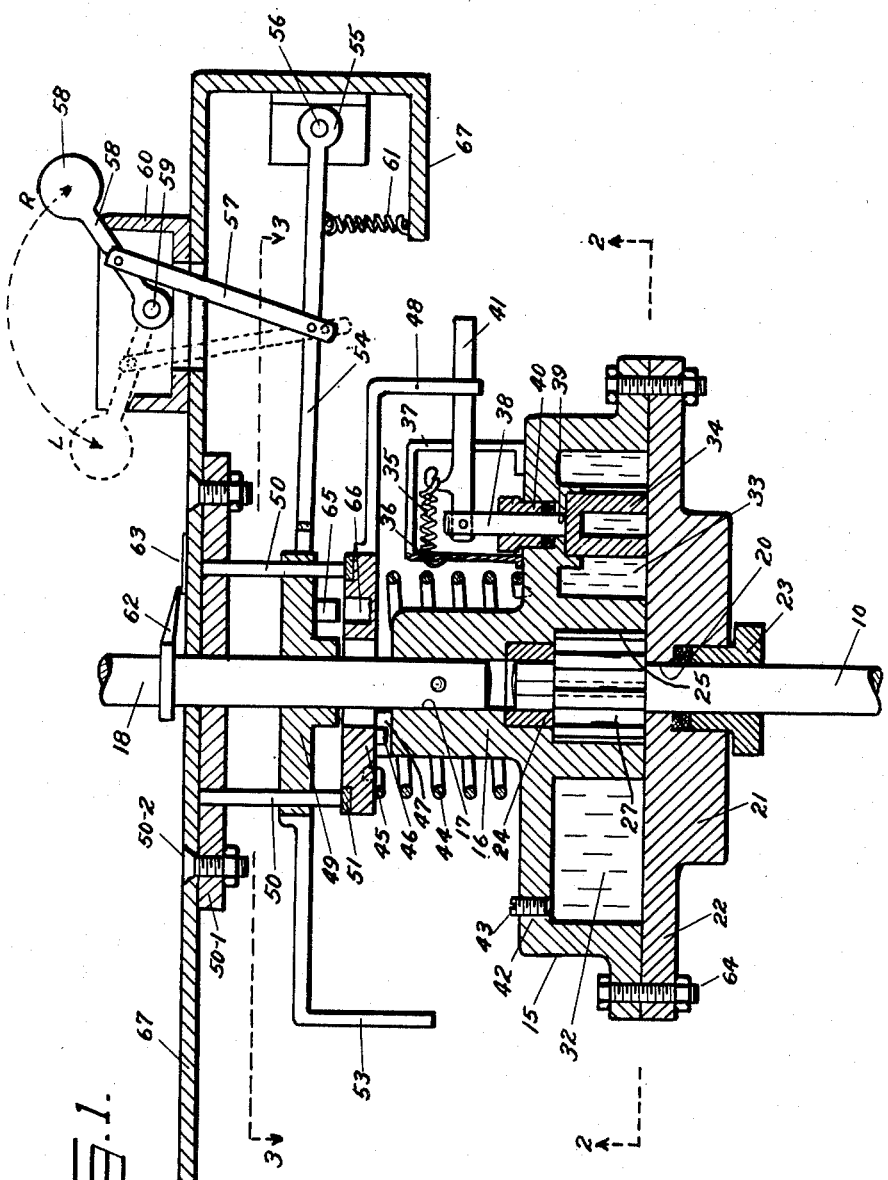
Fig. 1, is a sectional view of a coupling and transmission mechanism, exemplifying one form of the invention.

The form of transmission mechanism shown in the drawings comprises a drive shaft 10 which may be driven by any suitable source of power, such as an electric motor. The housing member 15 is provided with a hub 16 having a central bore 17 to which the driven shaft 18 is rigidly attached by a suitable key. The drive shaft 10 is journaled in a bore 20 of the hub 21 of a circular plate member 22, which is rigidly attached to the housing member 15 by means of suitable fastening members such as bolts 64, so that the bore 20 in hub 21 is in axial alignment with the bore 17 in hub 16 of housing member 15. The stuffing box 23 provides a fluid-tight seal between the bore 20 and drive shaft 10. The bore 17 in housing member 15 is suitably enlarged to receive the bearing 24, of bronze, for instance, in which the inner end of drive shaft 10 is seated.

The gear chambers 25 and 26 are formed within the housing member 15. The gear chamber 25 contains a drive gear 27, which has a close fit with the walls of the gear chamber, and which is fixed on the drive shaft 10 by a suitable key. Meshing with the drive gear 27 is an idling gear 28 in gear chamber 26, rigidly attached to a stub shaft 29, journalled in suitable stub shaft bores formed in housing member 15 and in plate member 22. The idling gear 28 is freely rotatable and forms with the drive gear 27 within the walls of the gear chambers 25 and 26 respectively, a gear pump, which will carry any suitable hydraulic transmission fluid entering the gear chambers from the fluid compartment 32, into the pressure compartment 33. The pressure compartment 33 is connected through the valve means 34 with the fluid compartment 32.

The valve stem 38 of valve means 34 protrudes through a bore 39 to the exterior of housing member 15, and carries rigidly attached to its outer end the valve handle 41. The valve means 34 is actuated by valve handle 41 between a closed position 34—1 and an open position 34—2 shown in dotted line. The valve means 34 is held in the open or closed position by tension spring 35 anchored at 36 to spring supporting member 37. The spring supporting member 37 is rigidly attached to housing member 15 and is suitably shaped to confine the movement of valve handle 41 within the limits of a circle segment from the closed position 34—1 to the open position 34—2 of the valve means 34, and vice versa. The other end of tension spring 35 is shown connected to valve handle 41, so that due to the eccentric position of the anchoring point 36 from valve stem 38 the tension spring 35 will provide an impelling force acting upon valve handle 41, insuring that the valve handle 41 can only remain stationary in the two positions 34—1 and 34—2 respectively in which the valve means 34 is fully closed and fully open respectively. The bore 39 is suitably shaped to receive stuffing box 40 to provide a fluid-tight seal between valve stem 38 and bore 39.

The threaded bore 42, closed fluid-tight by threaded plug 43, in housing member 15 serves for the introduction and eventual refilling with hydraulic transmission fluid of the volumetric space formed by the housing member 15 and plate member 22, comprising the fluid compartment 32, the two gear chambers 25 and 26, the pressure chamber 33, and the valve means 34.

One of the essential features of the invention is the combination of a clutch or coupling structure, for instance of the gear pump type as shown in the drawings, with a restoringly yieldable energy storing means, for instance a spiral spring, adapted to operate in conjunction with a mechanically or electro-magnetically operated locking device.

The inner end of spiral spring 44 is shown rigidly attached to hub 16. The other end of spiral spring 44 is rigidly attached to a ring member 45 which is centered and movably seated on driven shaft 18. Protruding downwardly from ring member 45 is an arresting block 46 and protruding upwardly on hub 16 is an arresting block 47, so arranged that the spring 44 may be held permanently under a certain amount of initial tension, due to the fact that this latent amount of energy stored in the form of an initial tension in spring 44 is permanently prevented from being released and imparting rotative movements in opposite directions to ring member 45 and hub 16, by the engagement of arresting flange 46 and the arresting block 47. Rigidly attached to the ring member 45 is a coupling control member 48 shaped to protrude with its outer end into the circular path of valve handle 41. The function of the coupling control member 48 is to actuate the valve means 34 to the closed position when the valve handle 41 hits against the coupling control member 48. The fixed position of the control member 48 on ring member 45 is so chosen that the interaction between control member 48 and valve handle 41 causes the valve means 34 to be closed when, or just before, the arresting flange and the arresting block 47 meet.

As will be understood by those versed in the art, the coupling and transmission system described so far, forms a coupling connection between the drive shaft 10 and driven shaft 18 whereby the rotations of drive shaft 10 are transmitted in the form of substantially similar rotations to driven shaft 18.

When a rocking motion is to be imparted to the driven shaft 18, the ring member 45 is locked in a fixed position, for instance with the locking ring 49. The locking ring 49 is movably seated on driven shaft 18 and is prevented from rotation by the guide shafts 50, firmly attached to a supporting disk 50—1 which is attached by suitable fastening members 50—2 to the structural member 67 which forms part of a suitable housing structure (not shown) of the coupling and transmission mechanism. The guide shafts 50 permit the locking ring 49 to slide back and forth along the axis of driven shaft 18 and carry rigidly attached the spacer ring 51, slideably seated on ring member 45, permitting the ring member 45 to rotate, but preventing it from any movement in the direction of the axis of driven shaft 18.

A locking connection between locking ring 49 and ring member 45 is established by suitably interfitting locking elements 65, 66 when the locking ring 49 is moved toward and held against ring member 45. Firmly attached to the locking ring 49 is a decoupling control member 53, shaped to protrude with its outer end into the circular path of the valve handle 41 when the locking ring 49 is set to establish a locking connection with ring member 45, but to remain outside of the circular path of valve handle 41 or any other revolving member of the structure when the ring member 45 is not locked in a fixed position. The locking ring 49 is moved parallel to the axis of driven shaft 18 toward the ring member 45 or away from it, by the lever 54 which is pivotally suspended at 55. The pivot 55 is rigidly attached to the structural member 67. The lever 54 is connected by rod 57 to setting lever 58 which is pivotally attached at 59 to the stopping block 60 which is rigidly attached to structural member 67.

When the setting lever 58 is set to the raised R position the stopping block 60 insures that the entire locking mechanism is held in a position in which the ring member 45 is completely disengaged from any locking connection with locking ring 49 and the decoupling control member 53 is rendered inoperative. The tension spring 61 between the lever 54 and structural member 67 serves to stabilize the position of the locking mechanism when the setting lever 58 is set to the R position. The tension spring 61 also serves to stabilize the positive locking connection between locking ring 49 and ring member 45 when the setting lever is set to the lowered L or locking position.

Further features of the coupling and transmission mechanism described above will appear from the following description of its operation.

When a simple transmission of the rotations of the drive shaft 10 to the driven shaft 18 is desired, the setting lever 58 is set to the raised R position. The initial tension in spiral spring 44 insures that, due to the interaction between valve handle 41, the coupling control member 48 and tension spring 35, the valve member 34 is actuated to the closed position 34—1, blocking the passage of any fluid from pressure chamber 33 to fluid compartment 32. Consequently, if the drive shaft 10 is rotated, rotating the drive and idling gears in the directions as indicated by arrows in the drawing, and all the volumetric inner space formed by housing member 15 and enclosed by plate cover 22 is filled with a suitable hydraulic transmission fluid, the pumping action of the gears 27 and 28 respectively will produce a rapidly increasing pressure in pressure chamber 33, so that this pressure will act as a brake on the free rotating movement of the idling gear 28, and cause it to rotate as a planetary gear around the axis of drive shaft 10, this rotation being also imparted to the entire coupling and transmission structure, including the driven shaft 18.

The number of rotations per minute of driven shaft 18 will be lower than the number of rotations per minute of drive shaft 10, due to the slippage of fluid from pressure chamber 33 back to the fluid compartment 32. If desired, this transmission differential may be further increased by a small fixed or adjustable bypass opening leading from the pressure chamber 33 to the fluid compartment 32 as indicated in the drawing by dotted lines 30.

When it is desired that the unidirectional rotations of the drive shaft 10 shall transmit a rocking motion to the driven shaft 18, the setting lever 58 is set to the lowered L position, to cause the locking ring 49 to lock through locking elements 65, 66, the ring member 45 in a fixed position and to cause the decoupling control member 53 to protrude into the circular path of the valve handle 41.

Now when the drive shaft 10 is rotated, the coupling structure will again start to rotate. Part of the energy transmitted from drive shaft 10 will be stored as increased tension in the spring 44, and part of the energy transmitted will rotate driven shaft 18, until the valve handle 41 strikes the decoupling control member 53 and causes the valve means 34 to be opened. This causes the almost instantaneous decrease of fluid pressure in pressure chamber 33, thus eliminating the coupling connection between the drive shaft and the driven shaft. Thereupon, the restoring action of the added tension in spring 44 causes the housing member 15 and all parts attached thereto, including the driven shaft 18, to rotate in the reverse direction back to the starting position, where the valve handle 41, hitting against the coupling control member 48, causes the valve means 34 to be closed, causing the reestablishment of the coupling connection between drive shaft and driven shaft, and so forth, with the result that the rotating motion of the drive shaft 10 is transmitted to the driven shaft 18 in the form of an alternatingly rotating or rocking motion.

The amplitude of the rocking motion imparted to the driven shaft 18 is determined by the relative position of the coupling control member 48 from the decoupling control member 53. By placing the setting lever 58 in the R position, the driven shaft 18 can be rotated manually, so that the relative distance between the coupling and decoupling control members 48 and 53 respectively, can be changed by turning the driven shaft 18, or any suitable member attached thereto. With the changing of the amplitude, the rate of acceleration and speed of the rocking motion will also vary. Inasmuch as a certain length of time is required for the building up of the fluid pressure in the pressure chamber 33, causing the coupling action between the drive shaft and the driven shaft to take effect gradually, the close spacing of the coupling control member 48 to the decoupling control member 53 will cause the valve means 34 to be opened before a substantially complete coupling between the drive shaft 10 and driven shaft 18 has taken place. Consequently, the acceleration in the speed of the fractional rotation of the driven shaft 18 will still be on a relatively low level at the instant when, through the opening of valve means 34 the building up of the coupling effect is interrupted. Similarly, the shorter the fraction of rotation is in the direction of rotation of the drive shaft 10, the smaller will be the amount of energy stored in spring 44, and consequently, the reverse fractional rotation caused by the tension of spring 44 will also remain relatively slow. Thus the increasing or decreasing of the amplitude of the rocking motions also provides a variation in intensity of these rocking motions from vigorous to gentle and vice versa. When the ring member 45 is locked in a stationary position, the rotation of the hub 16 in the direction of the rotations of the drive shaft 10 is limited to less than 360 degrees on account of the obstruction in the circular path of arresting block 47 on hub 16 caused by the arresting flange on ring member 45.

The attainable maximum amplitude of these rocking motions is thus limited by the requirement that the decoupling control member 53 must become operative to cause the opening of the coupling connection between the drive shaft and the driven shaft before the arresting block 47 on hub 16 hits into the arresting flange on the ring member 45. A stub 65 is shown rigidly attached to locking ring 49, to prevent the engagement of the spline connection 52 between locking ring 49 and ring member 45 when the relative positions of the control members 48 and 53 respectively are beyond the safe limits of the permissible maximum amplitude. When the relative positions of the control members 48 and 53 respectively are such, to insure that the amplitude of the resulting rocking motion will not exceed the limits of the possible and safe maximum amplitude, the stub 65 engages in groove 66 in ring member 45, thus permitting to lock the ring member 45 into a fixed position through engagement with the spline connection 52 of locking ring 49.

When the locking ring 49 is prevented by the stub 65 from engaging ring member 45 in a locked position, the position of lever 54 and connecting rod 57 prevents the setting lever 58 from being set to the L position, thus giving a visual and clear indication that the setting of the mechanism for imparting to the driven shaft a rocking motion of predetermined amplitude has not been accomplished properly.

To facilitate the predetermined setting of the mechanism for the desired amplitude of the rocking motions, a suitable indicating device may be used, such as a pointer 62 on driven shaft 18 or any member attached thereto, in connection with a scale 63 attached for instance to structural member 67, giving a visual indication for the setting of the amplitude of the rocking motions of driven shaft 18, in accordance with the position of the pointer 62 on the scale 63.

In some instances of practical application of the invention it is desirable to impart to the driven shaft 18 a unidirectional rotating motion of changing speed which varies continuously from low to high speed and vice versa. Fig. 4, shows a simple way of achieving the objective to impart such pulsating unidirectional rotations to the driven shaft 18 from the unidirectional rotations at constant speed of drive shaft 10.

The housing member 15—1 is shaped to provide an enlarged fluid compartment 32—1, which is filled with a suitable transmission fluid to the level L as indicated in Fig. 4. When the drive shaft 10 is rotated and the setting lever 59 is set to the R position, the increasing fluid pressure in pressure chamber 33 causes the rapid establishment of a close coupling connection between the drive shaft and the driven shaft. However, the centrifugal forces generated by the rotations of the coupling structure, now force the transmission fluid to the periphery of fluid compartment 32—1 thus preventing additional transmission fluid from entering the gear chambers. Due to the small bypass opening 30—1 from pressure chamber 33 into fluid compartment 32—1 the gradual decrease of fluid pressure chamber 33 causes a gradual decoupling effect, so that the speed of rotation of the driven shaft will begin to decrease and continue to decrease until, the effect of the centrifugal forces having almost completely disappeared, the transmission fluid gravitates towards resuming its former level. Thereupon the gear chambers become refilled with transmission fluid, the pressure is reestablished in pressure chamber 33, causing the reestablishment of a close coupling connection between drive and driven shaft, thus causing the driven shaft to again rotate at a rapidly increasing speed, and so forth.

The imparting of a rotation to a driven shaft at such a variable speed whereby the governing factor for the increase or decrease in speed is determined by the resultant of the vectors of the gravitational and centrifugal forces, is of good practical advantage in many instances, such as in the operation of a washing machine. When extracting the water from the articles washed, through rotating the wash container at a relatively high speed, an uneven distribution of the articles in the container may cause an excessive amount of vibrations of the entire machine. By imparting to the driven shaft, which rotates the wash container, a rotation of changing speed, whereby the speed of rotation remains for a short period of time above the limits beyond which liquid is extracted effectively by centrifugal action from the articles washed, and thereupon permitting the speed of rotation to slow down below that limit for a subsequent short period of time, a redistribution of the articles in the wash container takes place toward the end of each slow down period, producing quickly a more even and balanced distribution. Thus by imparting to the driven shaft a rotation at changing speed as described, the possibility for the generation of continued excessive vibrations during the centrifuging period is eliminated.

Fig. 5, shows one form of practical application of the invention in a washing machine. Rigidly attached to the bottom portion of the cylindrical or rectangular housing 71 is a suitably shaped supporting plate 72, with suitable supports attached to its lower portion, such as casters 73. The motor 74 is attached to the supporting plate 72. The pulley 75 is keyed to motor shaft 76 and drives through belt connection 77 the pulley 78 which is keyed to drive shaft 10 of the coupling and transmission structure. The driven shaft 18 is journaled in the center of washtank 79. A wash container 80 being open on the top has a plurality of perforations in its bottom and side walls permitting the circulation of liquid between wash container 80 and washtank 79. A plurality of impeller fins, indicated at 81, is mounted within the wash container 80. The wash container 80 is seated on the driven shaft 18 and detachably connected to it by means of a suitable coupling connection (not shown) so as to insure that the rotary and/or oscillatory motions of the driven shaft 18 are imparted to the wash container 80. This coupling connection also insures that the wash container 80 can be seated on an coupled with the driven shaft 18 only in one predetermined position, so that the location of the pointer 82 on the top rim of wash container 80 is permanently fixed to be always the same with respect to the position of coupling member 48. A suitable scale, indicated at 83, is attached or engraved around the top of washtank 79, so that when the wash container 80, properly seated on driven shaft 18, is turned manually, this will change the relative positions of coupling members 48 and decoupling members 53 and thus it is possible to preset the amplitude of the rocking motion to be imparted to the wash container 80 by the driven shaft 18, in accordance with the position of pointer 82 on scale 83. Thereupon the locking ring 49 is engaged into a locking connection with ring member 45 by means of a suitable lever mechanism, for instance as shown in Fig. 1, or as indicated at 58—1 in Fig. 5. The driving mechanism is now ready for operation to impart to the wash container 80 a rocking motion of a predetermined amplitude.

After completion of the washing and rinsing operations, which may be controlled manually or automatically, the drying phase of the washing cycle is initiated by actuating manually or automatically the lever mechanism 58—1 to disengage the locking ring 49 from its locking connection with ring member 45, whereupon the rotations of the drive shaft 10 will be imparted directly to the driven shaft 18 and the wash container 80, either at a continuous rate of speed or at a changing rate of speed.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described above.

What I claim is:

1. A drive shaft; a driven shaft; coupling means including a coupling structure having two coupling elements connected to said shafts and a coupling member movable between a coupling position in which said driven shaft is coupled to said drive shaft and a decoupling position in which said driven shaft is decoupled from said drive shaft; energy storing means interconnected with said driven shaft and coupling control means for biasing said coupling member to the coupling position; decoupling means including a decoupling member selectively operative to actuate said coupling member to the decoupling position after a predetermined rotational movement of said driven shaft from a predetermined setting position thereof; said energy storing means including a selectively operative locking element engageable with said decoupling means and forming part of oscillatory means selectively operative to impart to said driven shaft an oscillatory motion when said locking element is locked and said drive shaft rotates; said oscillating means arranged so that when said locking element is locked against rotation the coupling means will transmit the rotation of said drive shaft to said driven shaft and cause it to store additional energy in said energy storing means until the coupling connection is broken by the engagement of said decoupling means with the coupling member and causes said energy storing means to return said driven shaft to the setting position as a part of said oscillatory motion; means for selectively locking said locking element in different peripheral positions for selectively controlling the amplitude of the reciprocating rotational motion of said driven shaft; said oscillating means and said decoupling means being ineffective when said locking element is not locked so as to permit said driven shaft to be rotated unidirectionally by said drive shaft.

2. A drive shaft; a driven shaft; housing means fixed on one of said shafts; a fluid pump structure adapted to pump fluid when said housing means rotates with respect to said other shaft; walls defining a pressure chamber and a fluid compartment in said housing means connecting the outlet and inlet of said fluid pump structure; valve means adapted to selectively open and close the passage of fluid from said pressure chamber into said fluid compartment; a valve operating member movable between an open position of said valve means and a closed position of said valve means, blocking the passage of fluid from said pressure chamber into said fluid compartment when said valve means is set to the closed position to cause the establishment of a hydraulic coupling connection between said shafts by said fluid pump structure; a selectively operative locking element interconnected with said driven shaft by an energy storing means; coupling control means connected with said energy storing means for normally biasing said valve operating means to a closed position of said valve means; decoupling means including a decoupling member to actuate said valve operating member to the open position of said valve means after a predetermined degree of rotational movement of said driven shaft from a predetermined starting point thereof; said decoupling member being connected to said locking element for operating only when said locking element is locked; said decoupling means being ineffective when said energy storing means is not locked by said locking element permitting uninterrupted maintenance of said hydraulic coupling connection between said shafts for the transmission of rotation from said drive shaft to said driven shaft; said energy storing means and said locking element arranged so that when said energy storing means is locked against rotation by said locking element, said hydraulic coupling connection by said fluid pump structure will cause energy from said drive shaft to be transmitted partially to said driven shaft and partially to said energy storing means until the interaction between said decoupling means and said valve operating means causes said valve means to open and to interrupt said coupling connection for the transmission of energy from said drive shaft, whereupon the additional energy stored in said energy storing means rotates said driven shaft in the reverse direction returning it to the starting point where the action of said coupling control means for normally biasing said valve operating means to a closed position of said valve means causes the reestablishment of said hydraulic coupling connection between said shafts to start a new cycle of alternatingly rotating or rocking motions imparted to said driven shaft.

3. In a coupling and transmission mechanism a drive shaft interconnected with a driven shaft by a selectively operative coupling structure including coupling control means; energy storing means interconnected between said driven shaft and selectively operative locking elements movable between locked and unlocked positions so that when said locking elements are in unlocked position they do not lock to said energy storing means and said coupling control means maintains an uninterrupted coupling connection through said coupling structure between said shafts to cause said driven shaft to rotate with the drive shaft and in the same direction; and when said locking elements are in locked position they lock to said energy storing means and coact with the coupling control means so that the unidirectional rotation of said drive shaft causes said driven shaft to rotate adding energy to the energy storing means until the locking elements engage the coupling control means and operate it so that the coupling connection established by said coupling structure is rendered inoperative and said driven shaft is reversely rotated and returned by said energy storing means to the starting position where said coupling control means is actuated to cause the reestablishment of the coupling connection between said shafts, impelling said driven shaft to perform continuously alternating rotational motions.

4. In a driving mechanism: a drive shaft arranged to rotate in one direction; a driven shaft arranged to be selectively driven by the drive shaft; a drive interconnection between the drive shaft and the driven shaft for causing the drive shaft while rotating in the same direction to impart to the driven shaft alternate rotary movements in opposite directions; said drive interconnection including energy storing means and a coupling structure having coupling control means for establishing and breaking a coupling connection between the drive shaft and the driven shaft so that said drive shaft causes said energy storing means to be alternately actuated to store and supply energy during successive cycles of the alternating movements of said driven shaft.

5. In a driving mechanism: a drive shaft arranged to rotate in one direction; a driven shaft arranged to be selectively driven by the drive shaft; a drive interconnection between the drive shaft and the driven shaft for causing the drive shaft while rotating in the same direction to impart to the driven shaft alternate rotary movements in opposite directions; said drive interconnection including energy storing means and a coupling structure having coupling control means for establishing and breaking a coupling connection between the drive shaft and the driven shaft so that said drive shaft causes said energy storing means to be alternately actuated to store and supply energy during successive cycles of the alternating movements of said driven shaft; said driving interconnection including means for variably setting the amplitude of the alternate rotary movements of said driven shaft.

6. A drive shaft; a driven shaft; housing means fixed on one of said shafts; a fluid pump structure adapted to pump fluid when said housing means rotates at a low rate of speed with respect to said other shaft; walls defining a pressure chamber and a fluid compartment in said housing means connecting the outlet and inlet of said fluid pump structure; said fluid compartment adapted to insure the admission of fluid through said inlet to said fluid pump structure only when said fluid pump structure is not rotated or when said fluid pump structure is rotated at a low rate of speed and to insure that the admission of fluid through said inlet to said fluid pump structure is prevented by the action of the centrifugal forces when said fluid pump structure is rotated at a relatively higher rate of speed; valve means adapted to open or close the passage of fluid from said pressure chamber into said fluid compartment; a valve operating member movable between an open position of said valve means and a closed position of said valve means, blocking the passage of fluid from said pressure chamber into said fluid compartment when said valve means is set to the closed position to cause the establishment of a hydraulic coupling connection between said shafts by said fluid pump structure; a selectively operative locking element movable between locking and unlocking positions interconnected with said driven shaft by an energy storing means; coupling control means connected with said energy storing means for normally biasing said valve operating means to the closed position of said valve means; decoupling means including a decoupling member connected with said locking element to actuate said valve operating member to the open position of said valve means after a predetermined degree of rotational movement of said driven shaft from a predetermined starting point thereof when the locking element is in locked position; said decoupling means being ineffective when said energy storing means is not locked by said locking element thereby permitting the transmission of a unidirectional rotation at a continuously changing rate of speed from said drive shaft to said driven shaft; said energy storing means and said locking element arranged so that when said energy storing means is locked against rotation by said locking element, said hydraulic coupling connection by said fluid pump structure will cause energy from said drive shaft to be transmitted partially to said driven shaft and partially to said energy storing means until the interaction between said decoupling means and said valve operating means causes said valve means to open and to interrupt said coupling connection for the transmission of energy from said drive shaft, whereupon the additional energy stored in said energy storing means, rotates said driven shaft in the reverse direction, causing said driven shaft to return to the starting position where the action of said coupling control means for normally biasing said valve operating means to a closed poistion of said valve means causes the reestablishment of said hydraulic coupling connection between said shafts to start a new cycle of alternatingly rotating or rocking motions imparted to said driven shaft.

HERMANN SCHEIBLER.

REFERENCES CITED

The following references are of record in the file of this patent:

UNITED STATES PATENTS

| Number | Name | Date |
|---|---|---|
| 1,696,718 | Kuhlmann et al. | Dec. 25, 1928 |
| 1,964,520 | Krauss | June 26, 1934 |